(12) United States Patent
Kanamura et al.

(10) Patent No.: US 12,536,508 B2
(45) Date of Patent: Jan. 27, 2026

(54) INFORMATION PROCESSING APPARATUS, HEAD MANAGEMENT METHOD, AND HEAD MANAGEMENT SYSTEM

(71) Applicant: SEIKO EPSON CORPORATION, Tokyo (JP)

(72) Inventors: Naoya Kanamura, Shiojiri (JP); Kenya Sakurai, Matsumoto (JP); Katsuaki Sato, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 248 days.

(21) Appl. No.: 18/321,583

(22) Filed: May 22, 2023

(65) Prior Publication Data

US 2023/0342731 A1  Oct. 26, 2023

(30) Foreign Application Priority Data

May 24, 2022  (JP) .................................. 2022-084334

(51) Int. Cl.
*G06Q 10/20* (2023.01)
*B41J 2/045* (2006.01)

(52) U.S. Cl.
CPC ............ *G06Q 10/20* (2013.01); *B41J 2/0451* (2013.01); *B41J 2/04586* (2013.01)

(58) Field of Classification Search
CPC .... B41J 2/0451; B41J 2/04586; B41J 29/393; G06Q 10/20; G06Q 10/083
See application file for complete search history.

(56) References Cited

U.S. PATENT DOCUMENTS

| | | | |
|---|---|---|---|
| 10,946,642 B2* | 3/2021 | Tsuchihashi | B41J 2/1752 |
| 11,807,011 B2 | 11/2023 | Suzuki | |
| 2022/0080726 A1* | 3/2022 | Suzuki | G06N 20/00 |
| 2022/0080736 A1* | 3/2022 | Suzuki | B41J 2/17546 |

FOREIGN PATENT DOCUMENTS

| | | |
|---|---|---|
| CN | 114193929 | 3/2022 |
| JP | 2021-185456 A | 12/2021 |

* cited by examiner

*Primary Examiner* — Thinh H Nguyen
(74) *Attorney, Agent, or Firm* — WORKMAN NYDEGGER

(57) ABSTRACT

A server is an information processing apparatus that is connected to a printer including a replaceable printing head and manages delivery of the printing head, the information processing apparatus including a replacement-information acquiring unit configured to acquire replacement information indicating that the printing head was replaced, a determining unit configured to, when the replacement-information acquiring unit acquires the replacement information, determine presence or absence of an abnormality concerning the replacement based on a delivery history of the printing head, and a notifying unit configured to perform notification corresponding to a determination result of the determining unit.

9 Claims, 6 Drawing Sheets

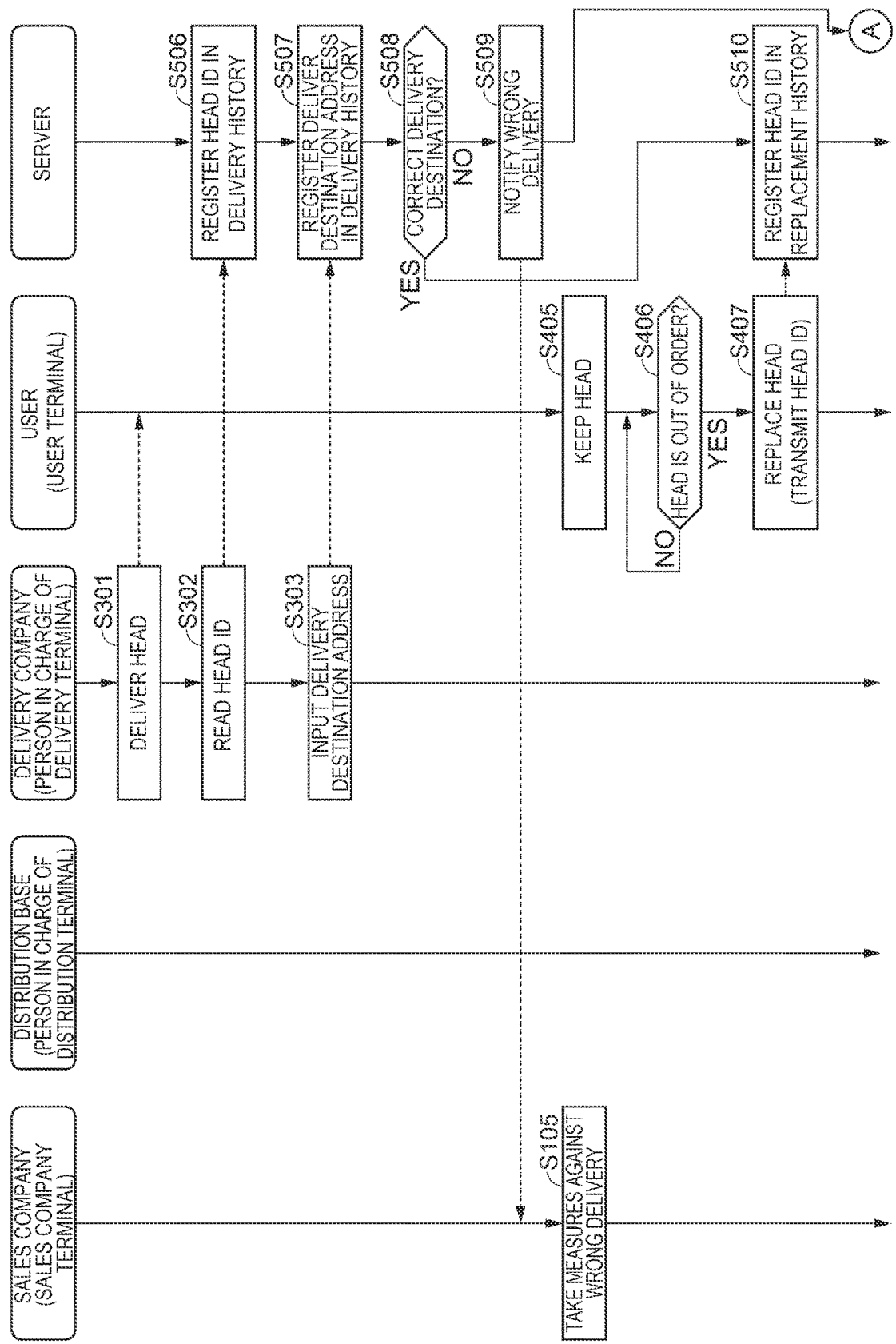

INFORMATION PROCESSING APPARATUS, HEAD MANAGEMENT METHOD, AND HEAD MANAGEMENT SYSTEM

The present application is based on, and claims priority from JP Application Serial Number 2022-084334, filed May 24, 2022, the disclosure of which is hereby incorporated by reference herein in its entirety.

BACKGROUND

1. Technical Field

The present disclosure relates to an information processing apparatus, a head management method, and a head management system.

2. Related Art

There has been known a system that delivers expendables of an image forming apparatus such as a printer. In a system described in JP-A-2021-185456 (Patent Literature 1), when a residual amount of a recording agent of the printer decreases to less than a predetermined value, an order server performs a procedure for ordering the recording agent, whereby the recording agent is delivered to a user. The user replaces the recording agent having no residual amount with the delivered new recording agent.

A system that delivers a component for replacement according to a failure or the like of an image forming apparatus and causes a user to replace the component has been realized. In such replacement of the component, a frequency of the replacement is lower and difficulty of the replacement is higher compared with the replacement of the recording agent. Therefore, an abnormality sometimes occurs during the replacement, for example, an unexpected component is attached. However, it has been difficult for a sales company or the like to recognize the occurrence of such an abnormality.

SUMMARY

An information processing apparatus is an information processing apparatus that is connected to an image forming apparatus including a replaceable head and manages delivery of the head, the information processing apparatus including: a replacement-information acquiring unit configured to acquire replacement information indicating that the head was replaced; a determining unit configured to, when the replacement-information acquiring unit acquires the replacement information, determine presence or absence of an abnormality concerning the replacement based on a delivery history of the head; and a notifying unit configured to perform notification corresponding to a determination result of the determining unit.

A head management method is a head management method for managing delivery of a replaceable head attached to an image forming apparatus, the head management method including: acquiring replacement information indicating that the head was replaced; when the replacement information is acquired, determining presence or absence of an abnormality concerning the replacement based on a delivery history of the head; and performing notification corresponding to a determination result.

A head management system is a head management system including: an image forming apparatus including a replaceable head; and an information processing apparatus that is connected to the image forming apparatus and manages delivery of the head, the information processing apparatus including: a replacement-information acquiring unit configured to acquire replacement information indicating that the head was replaced; a determining unit configured to, when the replacement-information acquiring unit acquires the replacement information, determine presence or absence of an abnormality concerning the replacement based on a delivery history of the head; and a notifying unit configured to perform notification corresponding to a determination result of the determining unit.

BRIEF DESCRIPTION OF THE DRAWINGS

FIG. 5B is a flowchart showing the head management method.

DESCRIPTION OF EXEMPLARY EMBODIMENTS

A head management system according to an embodiment is explained below with reference to the drawings.

Figure 1:
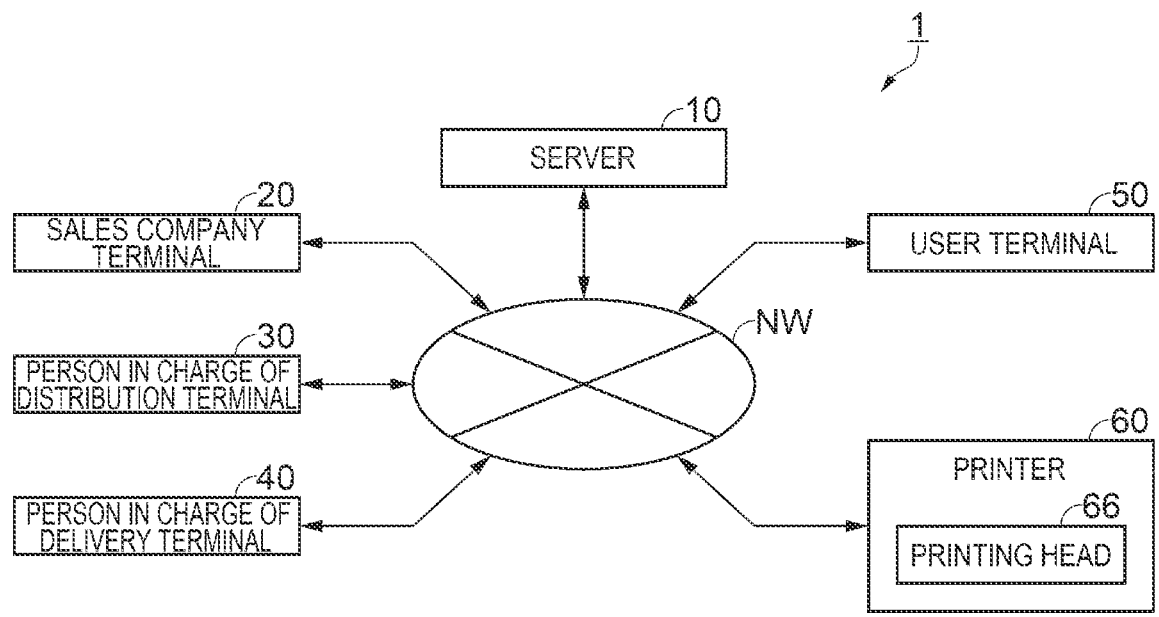
FIG. 1 is a configuration diagram showing an example of a schematic configuration of a head management system.

FIG. 1 is a configuration diagram showing an example of a schematic configuration of a head management system 1 in this embodiment.

As shown in FIG. 1, the head management system 1 includes a server 10, a sales company terminal 20, a person in charge of distribution terminal 30, a person in charge of delivery terminal 40, a user terminal 50, and a printer 60, which are connected to one another via a network NW such as the Internet. The printer 60 includes a replaceable printing head 66. The server 10 manages delivery of the printing head 66 for replacement and collection of the printing head 66 detached by replacement.

The sales company terminal 20 is a terminal device managed by a sales company that sells the printer 60 and the printing head 66 and is operated by a person in charge of sales who is in charge of the sales of the printer 60 and the printing head 66. In this embodiment, the person in charge of sales is also in charge of management of delivery and collection of the printing head 66. Therefore, the person in charge of sales is equivalent to the administrator. The person in charge of distribution terminal 30 is a terminal device provided in a distribution base where stocks of printing heads 66 are kept. The person in charge of distribution terminal 30 is operated by a person in charge of distribution who manages the stocks of the printing heads 66. The person in charge of delivery terminal 40 is a terminal device operated by a person in charge of delivery of a delivery company. When the printing head 66 is delivered from the distribution base to a user, the person in charge of delivery terminal 40 is carried by the person in charge of delivery. The user terminal 50 is a terminal device operated by a user who manages the printer 60. The sales company terminal 20, the person in charge of distribution terminal 30, the person in charge of delivery terminal 40, and the user terminal 50 are hereinafter respectively referred to as terminal devices 20, 30, 40, and 50 as well. The server 10 is an information processing apparatus that is the core of the head management system 1. The server 10 receives input of information from the terminal devices 20 to 50 and the printer 60 and performs processing corresponding to the information. For example, the server 10 notifies various kinds of information to the terminal devices 20 to 50.

The units of the head management system 1 are explained in detail below.

Figure 2:
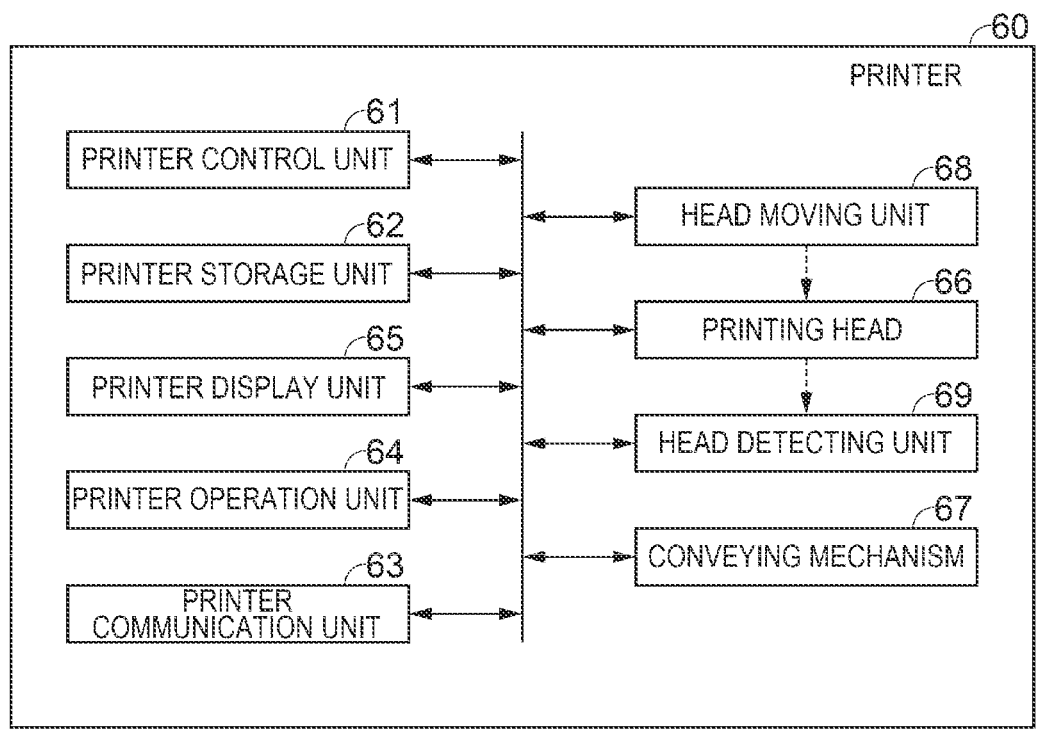
FIG. 2 is a block diagram showing an internal configuration of a printer.

FIG. 2 is a block diagram showing an internal configuration of the printer 60.

As shown in FIG. 2, the printer 60 includes a printer control unit 61, a printer storage unit 62, a printer communication unit 63, a printer operation unit 64, a printer display unit 65, the printing head 66 functioning as a head, a conveying mechanism 67, a head moving unit 68, and a head detecting unit 69. In this embodiment, the printer 60 is an image forming apparatus of an inkjet type that ejects ink, which is liquid, from the printing head 66 to thereby form, that is, print an image. That is, the printing head 66 is an inkjet head.

The printer control unit 61 includes a CPU (Central Processing Unit) and the like and operates according to a not-shown program stored in the printer storage unit 62 to thereby control an operation of the printer 60.

The printer storage unit 62 is configured by a storage device such as a memory and stores, in addition to the program described above, various setting data, printer IDs that are identification information for identifying respective printers 60, and the like. The printer IDs are equivalent to the apparatus identification information.

The printer communication unit 63 includes various interface circuits for performing communication with external apparatuses. The printer communication unit 63 in this embodiment includes an interface circuit for performing communication via the network NW.

The printer operation unit 64 is configured by an operation button and the like and receives input operation performed by the user and transmits the input operation to the printer control unit 61. The printer display unit 65 is configured by a liquid crystal display, an organic EL (Electro Luminescence) display, an LED (Light Emitting Diode), or the like and displays, for example, information based on control of the printer control unit 61. The printer operation unit 64 may be integral with the printer display unit 65 like a touch panel.

In the printing head 66, a plurality of nozzles for ejecting ink are formed. The printing head 66 ejects, based on the control of the printer control unit 61, ink supplied from a not-shown ink tank to a not-shown printing medium.

The conveying mechanism 67 conveys, based on the control of the printer control unit 61, a printing medium set in the printer 60 in a predetermined conveyance direction such that the printing medium passes a position where the ink is ejected by the printing head 66. The head moving unit 68 causes, based on the control of the printer control unit 61, the printing head 66 to reciprocate in a main scanning direction crossing the conveyance direction.

The printer control unit 61 performs main scanning for ejecting the ink from the nozzles of the printing head 66 while moving the printing head 66 in the main scanning direction to form, on the printing medium, a raster line in which dots are arranged in the main scanning direction. The printer control unit 61 can eject the ink to a wide range of the printing medium by alternately performing the main scanning and sub-scanning for moving the printing medium in the conveyance direction. The printer control unit 61 controls, based on printing data supplied from the user terminal 50, not-shown another computer, or the like, the operation explained above to thereby cause the printing head 66 to form an image based on the printing data on the printing medium.

A failure such as clogging of foreign matters in the nozzles can occur in the printing head 66 according to a situation of use of the printer 60. Therefore, the printing head 66 is configured to be replaceable. A person in charge of repair of the sales company or the like or a user who has undergone predetermined education can replace the printing head 66. When the user replaces the printing head 66, it is possible to further reduce expenses and time compared with when the user requests the sales company to replace the printing head 66. The user who has undergone the predetermined education replacing the printing head 66 is hereinafter referred to as "self-repair" as well.

The head detecting unit 69 detects, based on the control of the printer control unit 61, the printing head 66 attached to the printer 60. Specifically, a not-shown nonvolatile memory is attached to the printing head 66. Head IDs, which are identification information for identifying the individual printing heads 66, are written in the respective memories. The head detecting unit 69 is connected to the memory and reads a head ID from the memory to thereby detect the printing head 66. Further, the head detecting unit 69 can detect, based on the read head ID, the replacement of the printing head 66. A QR code (registered trademark), in which the head ID is written, is also attached to the printing head 66. The head ID is equivalent to the head identification information.

Figure 3:
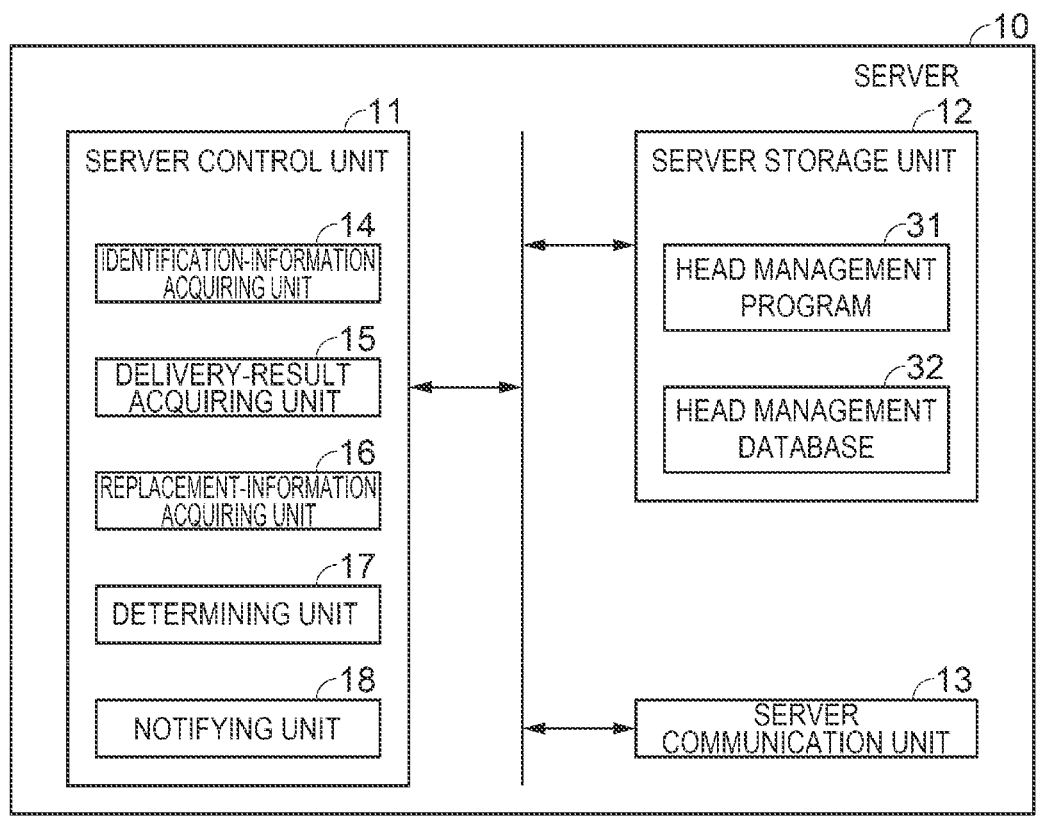
FIG. 3 is a block diagram showing an internal configuration of a server.

FIG. 3 is a block diagram showing an internal configuration of the server 10.

As shown in FIG. 3, the server 10 is configured by, for example, a general-purpose computer and includes a server control unit 11, a server storage unit 12, and a server communication unit 13. The server storage unit 12 and the server communication unit 13 are connected to the server control unit 11 via a bus or the like.

The server control unit 11 includes a CPU and memories such as a RAM (Random Access Memory) and a ROM (Read Only Memory). The server control unit 11 operates according to a not-shown OS (Operating System) and not-shown various application programs stored in the server storage unit 12 to thereby control an operation of the server 10 and execute various operations according to requests from the terminal devices 20 to 50 and the printer 60, which are clients.

The server storage unit 12 is configured by a storage device such as a hard disk drive or an SSD (Solid State Drive) and stores the OS and the various application programs described above and the like. The application programs stored in the server storage unit 12 include a head management program 31 for managing delivery, replacement, and collection of the printing head 66. A head management database 32 is stored in the server storage unit 12 in this embodiment. Various kinds of information concerning the user, the printer 60, and the printing head 66, which is a delivery target, are saved in the head management database 32 in association with one another. A delivery history, a replacement history, a collection history, and the like of the printing head 66 are configured by these kinds of information.

The server communication unit 13 includes various interface circuits for performing communication with the external apparatuses. The server communication unit 13 in this embodiment includes an interface circuit for performing communication via the network NW and can communicate with the terminal devices 20 to 50 and the printer 60 via the network NW. The server communication unit 13 is equivalent to the communication unit.

The server control unit 11 includes an identification-information acquiring unit 14, a delivery-result acquiring unit 15, a replacement-information acquiring unit 16, a determining unit 17, and a notifying unit 18 as functional units implemented by the head management program 31. The identification-information acquiring unit 14 acquires the head ID of the printing head 66 from the terminal devices 20 to 50 and the printer 60 in a process from delivery to the user of the printing head 66 to collection. When the printing head 66 is delivered to the user, the delivery-result acquiring unit 15 acquires, from the person in charge of delivery terminal 40, an address of a delivery distribution to which the printing head 66 has been actually delivered. When the printing head 66 of the printer 60 is replaced, the replacement-information acquiring unit 16 acquires, from the printer 60, replacement information indicating that the printing head 66 has been replaced. The determining unit 17 determines, based on the delivery history, the replacement history, and the collection history of the printing head 66, for example, presence or absence of abnormalities concerning the delivery, the replacement, and the collection. The notifying unit 18 performs notification corresponding to a determination result of the determining unit 17 via the server communication unit 13. Details of the functional units are explained below.

The server control unit 11 operating according to the head management program 31 functions as a WEB server as well and causes, in response to requests from the terminal devices 20 to 50, which are the clients, the terminal devices 20 to 50 to display a predetermined WEB page. Persons in charge and users who operate the terminal devices 20 to 50 can transmit, by accessing the WEB page and inputting various kinds of information, the information to the server 10. The WEB page that the server control unit 11 operating according to the head management program 31 causes the terminal devices 20 to 50 to display is hereinafter referred to as "head management page" as well.

Figure 4:
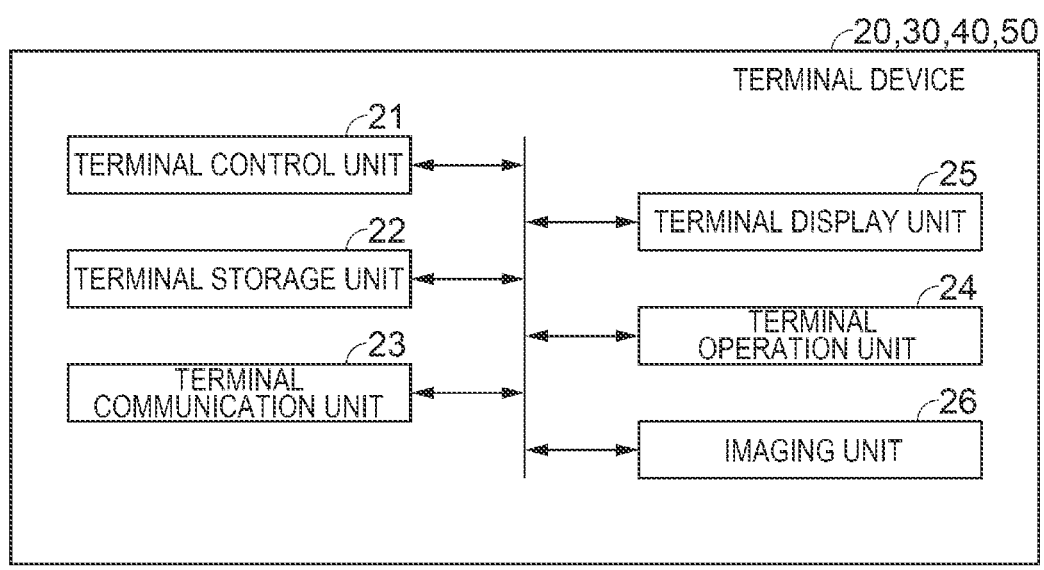
FIG. 4 is a block diagram showing an internal configuration of a terminal device.

FIG. 4 is a block diagram showing an internal configuration of the terminal devices 20 to 50.

As shown in FIG. 4, the terminal devices 20 to 50 are configured by a personal computer, a portable terminal of a tablet type, or the like. The terminal devices 20 to 50 each include a terminal control unit 21, a terminal storage unit 22, a terminal communication unit 23, a terminal operation unit 24, a terminal display unit 25, and an imaging unit 26.

The terminal control unit 21 includes a CPU and memories such as a RAM and a ROM and operates according to a not-shown OS and not-shown various application programs stored in the terminal storage unit 22 to thereby control operations of the terminal devices 20 to 50. The terminal storage unit 22 is configured by a hard disk drive, an SSD, or a storage device such as a memory and stores various data and the like in addition to the OS and the various application programs described above. The terminal communication unit 23 includes various interface circuits for performing communication with the external apparatuses. The terminal communication unit 23 in this embodiment includes an interface circuit for performing communication via the network NW.

The terminal operation unit 24 is configured by a keyboard, a pointing device, and the like and receives input operation performed by the persons in charge and the users and transmits the input operation to the terminal control unit 21. The terminal display unit 25 is configured by a liquid crystal display, an organic EL display, or the like and displays an image based on control of the terminal control unit 21. The terminal operation unit 24 may be integral with the terminal display unit 25 like a touch panel. The terminal operation unit 24 and the terminal display unit 25 may be separated from main bodies of the terminal devices 20 to 50 like a desktop computer.

The imaging unit 26 includes a camera and outputs a captured image captured by the camera to the terminal control unit 21. The imaging unit 26 in this embodiment is used for imaging of a QR code. However, the sales company terminal 20 and the user terminal 50 may not include the imaging unit 26.

A program capable of displaying a WEB page supplied from the server 10 such as a WEB browser is installed in the terminal storage unit 22 in this embodiment as an application program. As explained above, the terminal devices 20 to 50 may be a desktop or notebook personal computer or may be a portable terminal. However, since the person in charge of delivery terminal 40 is a terminal device carried during delivery by the person in charge of delivery, the person in charge of delivery terminal 40 is assumed to be a portable terminal. The terminal devices 20 to 50 are not limited to general-purpose equipment and may be equipment dedicated to the head management system 1.

Subsequently, a head management method by the head management system 1 is explained.

Figure 5A:
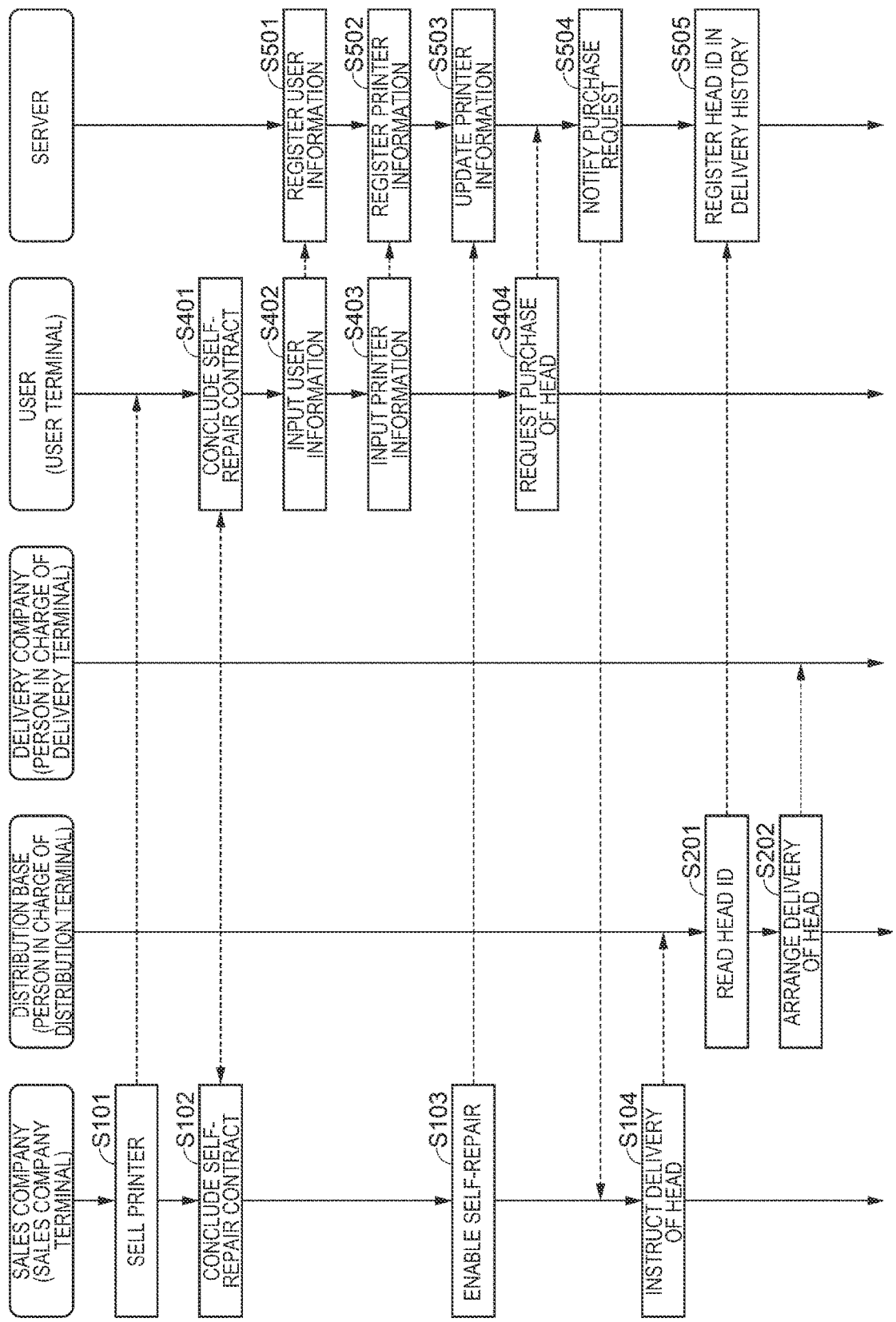
FIG. 5A is a flowchart showing a head management method.
Figure 5C:
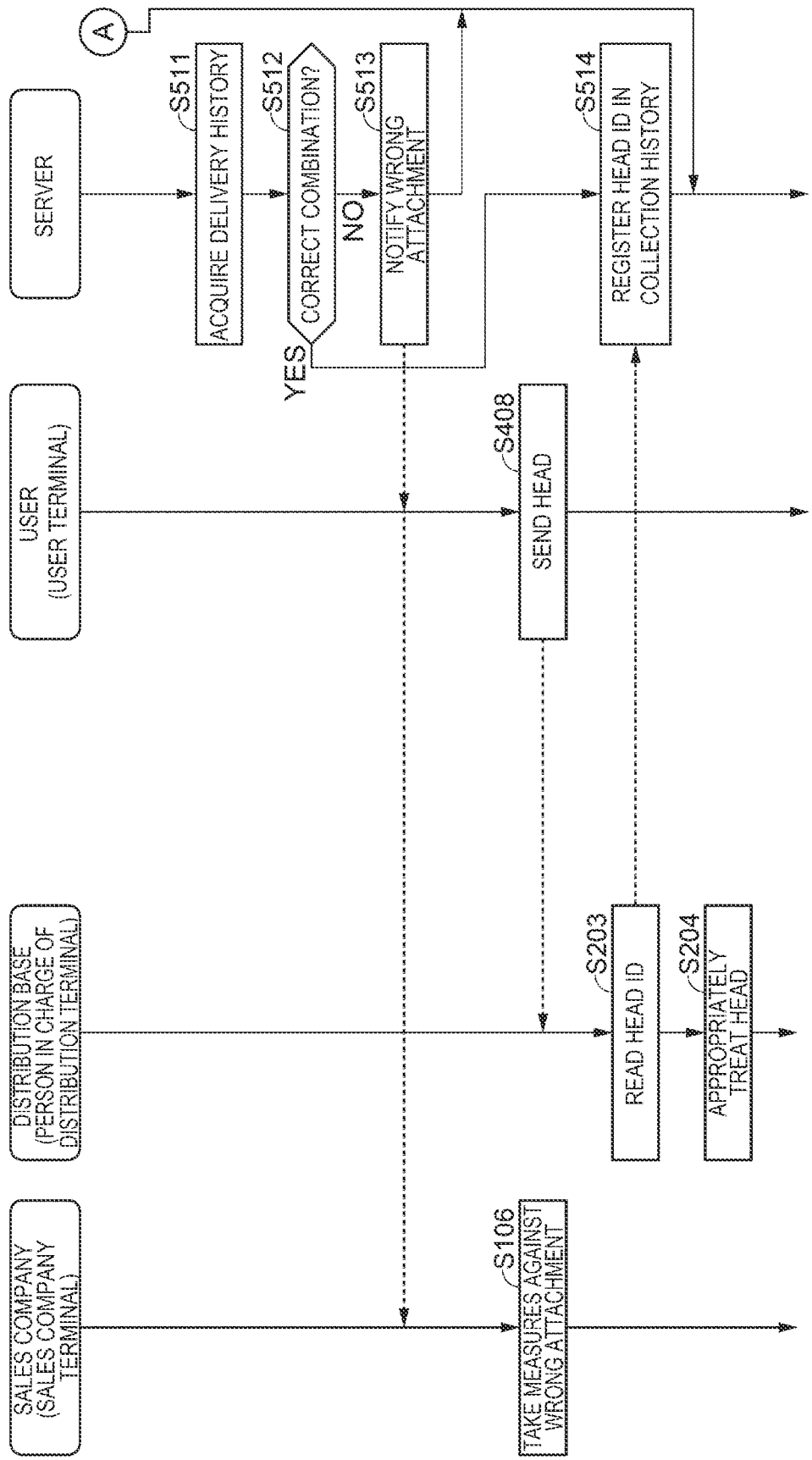
FIG. 5C is a flowchart showing the head management method.

FIGS. 5A, 5B, and 5C are flowcharts showing the head management method. The flowcharts include steps S101 to S106 indicating operations of the person in charge of sales of the sales company, steps S201 to S204 indicating operations of the person in charge of distribution of the distribution base, steps S301 to S303 indicating operations of the person in charge of delivery of the delivery company, steps S401 to S408 indicating operations of the user, and steps S501 to S514 indicating operations of the server 10.

As shown in FIGS. 5A to 5C, the person in charge of sales of the sales company sells the printer 60 to the user (step S101) and concludes a self-repair maintenance contract with the user (steps S102 and S401). The maintenance contract is a contract for, concerning replacement of the printing head 66, agreeing that the user who has undergone the predetermined education carries out the replacement.

After installing the printer 60 and connecting the printer 60 to the network NW, the user accesses the head management page from the user terminal 50 and carries out input of user information (step S402) and input of printer information (step S403). The user information includes a name of the user or a name of an organization to which the user belongs and an address and a mail address of a delivery destination to which the printing head 66 for replacement should be delivered. The printer information includes a model name and a printer ID of the printer 60. These kinds of information input by the user terminal 50 are transmitted to the server 10. The server control unit 11 acquires the input user information and registers the user information in the head management database 32 (step S501) and acquires the input printer information and registers the printer information in the head management database 32 in association with the user information (step S502).

Thereafter, the person in charge of sales accesses the head management page from the sales company terminal 20 and performs operation for enabling self-repair of the registered printer 60 (step S103). The server control unit 11 receives the operation, adds information indicating that the self-repair is enabled to the printer information and updates the printer information (step S503).

When the self-repair is enabled, the user is capable of purchasing the printing head 66 for replacement. The user accesses the head management page from the user terminal 50 and requests purchase of the printing head 66 for replacement (step S404). It is desirable that the purchase is performed not after a failure of the printing head 66 but before the failure.

When receiving the purchase request from the user, the server control unit 11 notifies the sales company terminal 20 that the purchase request is received (step S504). When receiving the notification, the person in charge of sales instructs, from the sales company terminal 20, the person in charge of distribution terminal 30 to deliver the printing head 66 to the user (step S104).

The person in charge of distribution receives the instruction and selects one printing head 66 to be delivered out of the stocks of the printing heads 66. In the delivery base, the printing heads 66 are stored in individual packing boxes. The same QR codes as QR codes attached to the printing heads 66, that is, QR codes in which head IDs of the stored printing heads 66 are written are attached to the surfaces of the individual packing boxes. When the person in charge of distribution images, with the imaging unit 26 of the person in charge of distribution terminal 30, a QR code attached to an individual packing box of the selected printing head 66 in a state in which the person in charge of distribution accesses the head management page from the person in charge of distribution terminal 30, the person in charge of distribution terminal 30 reads a head ID from a captured image of the QR code and transmits the head ID to the server 10 (step S201).

The identification-information acquiring unit 14 of the server 10 acquires the transmitted head ID and registers the head ID in the delivery history of the head management database 32 in association with the user information of the user who has requested the purchase (step S505). The acquisition and the registration of the head ID are performed before the printing head 66 is delivered. The head ID registered in step S505 can be referred to later as a history of the instruction of the delivery. In the head management database 32, since the user information includes the address of the delivery destination, an address of a delivery destination to which the printing head 66 should be delivered is associated with the head ID registered in the delivery history. Since the printer information is associated with the user information, a printer ID included in the printer information corresponding to the user information is associated with the head ID registered in the delivery history. That is, the printer 60 to which the printing head 66 to be delivered should be attached is determined by the registration. In other words, a combination of the printing head 66 and the printer 60 is determined. Thereafter, the person in charge of distribution makes arrangements for delivery of the printing head 66 with the delivery company (step S202).

The person in charge of delivery receives, from the distribution base, the printing head 66 to be delivered and delivers the printing head 66 to the delivery destination (step S301). After the printing head 66 arrives at the delivery destination, before sending the printing head 66 to the user, the person in charge of delivery images, with the imaging unit 26 of the person in charge of delivery terminal 40, the QR code of the individual packing box of the printing head 66 in a state in which the person in charge of delivery accesses the head management page from the person in charge of delivery terminal 40. When the imaging is performed, the person in charge of delivery terminal 40 reads the head ID from a captured image of the QR code and transmits the head ID to the server 10 (step S302). The identification-information acquiring unit 14 of the server 10 acquires the transmitted head ID and registers the head ID in the delivery history of the head management database 32 in association with the user information of the user who has requested the purchase (step S506).

Further, in a state in which the person in charge of delivery accesses the head management page from the person in charge of delivery terminal 40, the person in charge of delivery inputs the address of the delivery destination as information concerning the delivery destination to which the printing head 66 has been actually delivered (step S303). The delivery-result acquiring unit 15 of the server 10 acquires the input address of the delivery destination and registers the address of the delivery destination in the delivery history of the head management database 32 in association with the user information of the user who has requested the purchase (step S507). The head ID and the address of the delivery destination registered in steps S506 and S507 can be referred to later as a history of completion of the delivery.

Thereafter, the determining unit 17 of the server 10 determines, based on the delivery history, whether the printing head 66 has been delivered to a correct delivery destination (step S508). Specifically, the determining unit 17 determines whether the address of the delivery destination input by the person in charge of delivery, that is, the address of the delivery destination acquired by the delivery-result acquiring unit 15 and the address of the delivery destination included in the user information, that is, the address of the delivery destination associated with the head ID of the delivered printing head 66 coincide. When the addresses of the delivery destinations do not coincide (NO in step S508), the determining unit 17 determines that an abnormality concerning the delivery, that is wrong delivery has occurred. The notifying unit 18 of the server 10 notifies the sales company terminal 20 that the wrong delivery has occurred (step S509). When receiving the notification, the person in charge of sales takes measures against the wrong delivery, for example, makes contact with the person in charge of distribution or the person in charge of delivery and causes the person in charge of distribution or the person in charge of delivery to deliver the printing head 66 again (step S105). On the other hand, when the printing head 66 is delivered to a correct delivery destination (YES in step S508), the server control unit 11 executes processing in step S510 and subsequent steps.

When the printing head 66 is delivered, the user keeps the delivered printing head 66 until the printing head 66 attached to the printer 60 at that point in time breaks down (step S405). The user determines, based on a printing result and the like, whether the printing head 66 is out of order while using the printer 60 everyday (step S406). When there is no problem in the printing result and the like and the printing head 66 is not out of order (NO in step S406), the user continues to use the printer 60 and repeats the determination of presence or absence of a failure. On the other hand, when determining that a failure has occurred in the printing head 66 (YES in step S406), the user replaces the broken printing head 66 with the delivered printing head 66 for replacement (step S407).

When replacing the printing head 66, the user detaches the broken printing head 66 from the printer 60 in a state in which the printer 60 is turned off and attaches the delivered and kept printing head 66 to the printer 60 anew. Thereafter, when the printer 60 is turned on, the printer 60 resumes the operation. First, the head detecting unit 69 reads a head ID from a memory of the printing head 66 attached anew. The printer 60 transmits the read head ID to the server 10 together with the printer ID of the printer 60. The head ID and the printer ID transmitted by the printer 60 are equivalent to the replacement information indicating that the printing head 66 has been replaced. That is, the replacement information includes the head ID of the attached printing head 66 and the printer ID of the printer 60 in which the printing head 66 has been replaced.

The replacement-information acquiring unit 16 of the server 10 acquires the head ID and the printer ID transmitted as the replacement information and registers the head ID and the printer ID in the replacement history of the head management database 32 in association with each other (step S510). Specifically, the replacement-information acquiring unit 16 registers the acquired head IDs, that is, the head ID of the printing head 66 attached anew and the head ID of the printing head 66 attached before the replacement in the replacement history in association with the acquired printer ID.

Thereafter, the determining unit 17 of the server 10 acquires a delivery history of the printing head 66 corresponding to the transmitted head ID from the head management database 32 (step S511). The determining unit 17 determines, based on the acquired delivery history, whether a combination of the printing head 66 and the printer 60 is correct (step S512). Specifically, the determining unit 17 determines whether a combination of the head ID and the printer ID transmitted as the replacement information coincides with a combination of the head ID and the printer ID associated on the delivery history. When the combination is incorrect (NO in step S512), that is, when the head ID and the printer ID transmitted as the replacement information do not correspond, the determining unit 17 determines that an abnormality of the combination of the printing head 66 and the printer 60, that is, wrong attachment has occurred. The notifying unit 18 of the server 10 notifies the sales company terminal 20 that the wrong attachment has occurred (step S513). When receiving the notification, the person in charge of sales takes measures against the wrong attachment, for example, makes contact with the user (step S106). The notifying unit 18 may notify the occurrence of the wrong attachment to the user terminal 50 or the printer 60 in addition to the sales company terminal 20. In this case, it is possible to cause the user to quickly recognize that the wrong attachment has occurred. On the other hand, when the combination of the printing head 66 and the printer 60 is correct (YES in step S512), the server control unit 11 executes processing in step S514 and subsequent steps.

In the above explanation, "when the head ID and the printer ID do not correspond" includes, in addition to a case in which the printing head 66 associated with a different printer 60 is attached, for example, a case in which the head ID included in the replacement information is not registered in the delivery history and a case in which the head ID cannot be read from the attached printing head 66.

When finishing the replacement of the printing head 66, the user sends the printing head 66 detached by the replacement to the distribution base (step S408). That is, the printing head 66 is collected in the distribution base. When the printing head 66 is collected, in a state in which the person in charge of distribution accesses the head management page from the person in charge of distribution terminal 30, the person in charge of distribution images, with the imaging unit 26 of the person in charge of distribution terminal 30, a QR code attached to the surface of the collected printing head 66. When the QR code is imaged, the person in charge of distribution terminal 30 reads a head ID from a captured image of the QR code and transmits the head ID to the server 10 (step S203). The identification-information acquiring unit 14 of the server 10 acquires the transmitted head ID, that is, the head ID of the collected printing head 66 and registers the head ID in the collection history of the head management database 32 in association with the user information of the user (step S514). Thereafter, the person in charge of distribution performs appropriate treatment such as repair or discarding on the collected printing head 66 (step S204).

As explained above, according to this embodiment, it is possible to obtain the following effects.

(1) According to this embodiment, presence or absence of an abnormality concerning the replacement of the printing head 66 such as wrong attachment is determined based on the delivery history of the printing head 66 and notification corresponding to a determination result is performed to the sales company terminal 20. Therefore, when an abnormality concerning the replacement occurs, it is possible to cause the person in charge of sales to recognize to that effect.

(2) According to this embodiment, when the printer 60 and the printing head 66 attached to the printer 60 do not correspond, it is determined and notified that an abnormality concerning the replacement has occurred. Therefore, it is possible to cause the person in charge of sales to recognize that a wrong printing head 66 is likely to have been attached.

(3) According to this embodiment, when a head ID of the printing head 66 attached anew by the replacement is not registered in the delivery history, it is determined and notified that an abnormality concerning the replacement has occurred. Therefore, it is possible to cause the person in charge of sales to recognize that a wrong printing head 66 is likely to have been attached.

(4) According to this embodiment, when a delivery destination associated with the printing head 66 before delivery and a delivery destination to which the printing head 66 has been actually delivered are different, it is determined and notified that an abnormality concerning the delivery has occurred. Therefore, it is possible to cause the person in charge of sales to recognize that wrong delivery is likely to have occurred.

In the embodiment explained above, the wrong attachment of the printing head 66, that is, the abnormality of the combination of the head ID and the printer ID is equivalent to the abnormality concerning the replacement of the printing head 66. The sales company terminal 20 is equivalent to the first terminal device and the user terminal 50 is equivalent to the second terminal device. Step S510 for acquiring and registering the head ID transmitted from the printer 60 as the replacement information is equivalent to the acquiring replacement information. Step S512 for determining, based on the delivery history, whether the combination of the printing head 66 and the printer 60 is correct is equivalent to the determining presence or absence of an abnormality concerning the replacement. Step S513 for, when an abnormality of the combination occurs, notifying the occurrence of the abnormality is equivalent to the performing notification corresponding to a determination result. If the printing head 66 attached before the replacement in step S407 is the first head, the printing head 66 after being replaced is equivalent to the second head.

The embodiment explained above may be changed as follows.

In the embodiment explained above, the reading of the head ID (step S302) and the input of the delivery destination address (step S303) performed by the person in charge of delivery may be omitted. In this case, when wrong delivery occurs, the wrong delivery cannot be detected immediately after the delivery. However, it is possible to detect the wrong delivery as wrong attachment when the printing head 66 is replaced.

In the embodiment explained above, the notification and the instruction performed by the notifying unit 18 of the server 10 may be performed via a WEB page or may be performed using other means such as an electronic mail.

In the embodiment explained above, the three organizations of the sales company, the distribution base, and the delivery company are involved in the delivery of the printing head 66. However, the delivery of the printing head 66 is not limited to this form. For example, one organization may perform the functions of two or three organizations among the three organizations. In this case, two or three among the sales company terminal 20, the person in charge of distribution terminal 30, and the person in charge of delivery terminal 40 may be the same. Another organization such as an agency may perform a part of the functions of the three organizations.

In the embodiment explained above, the user information includes the address of the delivery destination as the information concerning the delivery destination and the delivery-result acquiring unit 15 of the server 10 acquires the address of the delivery destination input by the person in charge of delivery as the information concerning the delivery destination. However, the information concerning the delivery destination only has to be information that can specify the delivery destination and is not limited to the address. For example, if the delivery destination is an organization such as a company, the information concerning the delivery destination may be a name of the organization or position information represented by latitude and longitude or the like.

In the embodiment explained above, the delivery of the replaceable printing head 66 is explained. However, the embodiment can also be applied to delivery of components other than the printing head 66, for example, a cap for protecting the printing head 66 when not in use and a filter disposed in a channel of ink.

In the embodiment explained above, one printer 60 is connected to the head management system 1. However, a plurality of printers 60 may be connected to the head management system 1. The plurality of printers 60 may be managed by the same user or may be managed by different users.

In the embodiment explained above, the printer 60 may be an apparatus that prints an image on a printing medium and may be a serial printer, a lateral printer, a line printer, a page printer, or the like. A printing type is not limited to the inkjet type and may be a thermal type, a dot impact type, a laser type, or the like. That is, the printing head 66 is not limited to the inkjet head and may be a head of another type such as a thermal print head. The printer 60 only has to have at least a printing function for printing on a printing medium and may be a multifunction peripheral also having functions other than the printing function. Further, the printer 60 may be an apparatus that prints on not only a two-dimensional medium but also a medium having a three-dimensional curved surface.

What is claimed is:

1. An information processing apparatus that is connected to an image forming apparatus including a replaceable head and manages delivery of the head, the information processing apparatus comprising:

a replacement-information acquiring unit configured to acquire replacement information indicating that the head was replaced;

a determining unit configured to, when the replacement-information acquiring unit acquires the replacement information, determine presence or absence of an abnormality concerning the replacement based on a delivery history of the head; and a notifying unit configured to perform notification corresponding to a determination result of the determining unit.

2. The information processing apparatus according to claim 1, wherein head identification information for identifying a head to be delivered is registered in the delivery history, apparatus identification information for identifying the image forming apparatus to which the head to be delivered should be attached is associated with the head identification information, the replacement information includes the head identification information of the head attached anew and the apparatus identification information of the image forming apparatus in which the head is replaced, and when the apparatus identification information included in the replacement information and the head identification information included in the replacement information do not correspond, the determining unit determines that an abnormality concerning the replacement occurred.

3. The information processing apparatus according to claim 1, wherein head identification information for identifying a head to be delivered is registered in the delivery history, the replacement information includes the head identification information of the head attached anew, and when the head identification information included in the replacement information is not registered in the delivery history, the determining unit determines that an abnormality concerning the replacement occurred.

4. The information processing apparatus according to claim 1, further comprising a delivery-result acquiring unit configured to acquire information concerning a delivery destination to which the head was actually delivered, wherein head identification information for identifying a head to be delivered is registered in the delivery history, information concerning a delivery destination to which the head should be delivered is associated with the head identification information before the head is delivered, and when the information concerning the delivery destination acquired by the delivery-result acquiring unit is different from information concerning the delivery destination associated with the head identification information, the determining unit determines that an abnormality concerning the deliver occurred.

5. The information processing apparatus according to claim 1, further comprising a communication unit configured to communicate with a first terminal device operated by an administrator who manages delivery of the head, wherein the notifying unit performs the notification to the first terminal device via the communication unit.

6. The information processing apparatus according to claim 5, wherein the communication unit is configured to communicate with a second terminal device operated by a user who replaces the head, and the notifying unit performs the notification to the second terminal device via the communication unit.

7. The information processing apparatus according to claim 1, wherein the head is an inkjet head that ejects liquid.

8. A head management method for managing delivery of a replaceable head attached to an image forming apparatus, the head management method comprising:
   acquiring replacement information indicating that the head was replaced;
   when the replacement information is acquired, determining presence or absence of an abnormality concerning the replacement based on a delivery history of the head; and
   performing notification corresponding to a determination result.

9. A head management system comprising:
   an image forming apparatus including a replaceable head; and
   an information processing apparatus that is connected to the image forming apparatus and manages delivery of the head,
   the information processing apparatus comprising:
      a replacement-information acquiring unit configured to acquire replacement information indicating that the head was replaced;
      a determining unit configured to, when the replacement-information acquiring unit acquires the replacement information, determine presence or absence of an abnormality concerning the replacement based on a delivery history of the head; and
      a notifying unit configured to perform notification corresponding to a determination result of the determining unit.

* * * * *